United States Patent [19]

Young

[11] Patent Number: 5,368,323
[45] Date of Patent: Nov. 29, 1994

[54] BICYCLE SAFETY BAR APPARATUS

[76] Inventor: Stephen W. Young, 411 McClure St., Ashland, Ky. 41102

[21] Appl. No.: 69,758

[22] Filed: Jun. 1, 1993

[51] Int. Cl.⁵ .............................................. B62H 1/12
[52] U.S. Cl. .................................... 280/293; 280/297; 280/239
[58] Field of Search ..................... 280/239, 288.4, 293, 280/304, 297, 755, 295

[56] References Cited

U.S. PATENT DOCUMENTS

| 3,961,810 | 6/1976 | Arico ..................................... 280/239 |
| 4,153,268 | 5/1979 | Wilson et al. ........................ 280/304 |
| 4,353,571 | 10/1982 | Anderson ............................. 280/293 |

FOREIGN PATENT DOCUMENTS 8908043  9/1989  WIPO ................................ 280/293

Primary Examiner—Richard M. Camby
Assistant Examiner—Victor E. Johnson
Attorney, Agent, or Firm—E. Michael Combs

[57] ABSTRACT

A safety bar structure arranged for retrofit relative to an associated bicycle wheel is arranged to include projecting support rails extending radially beyond the rear bicycle wheel, wherein the support rails rotatably mount a pair of support wheels to prevent rotation of the bicycle frame about the rear wheel.

4 Claims, 4 Drawing Sheets

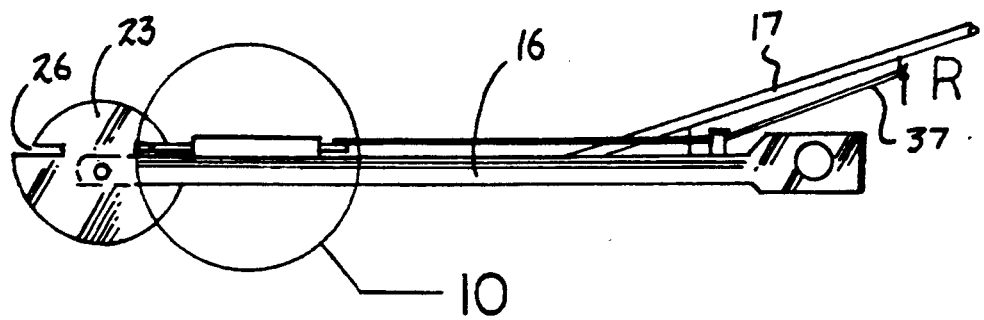
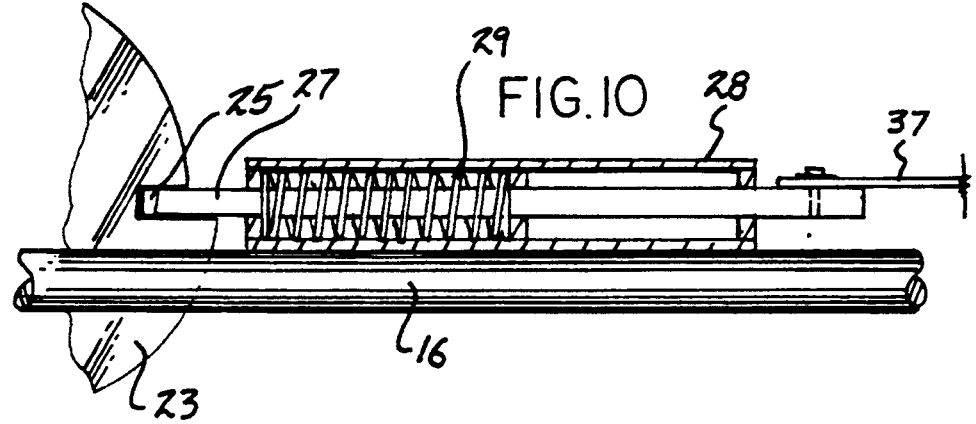
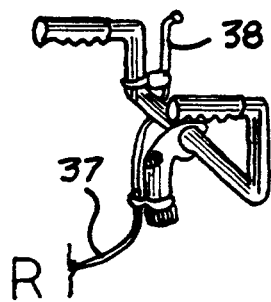
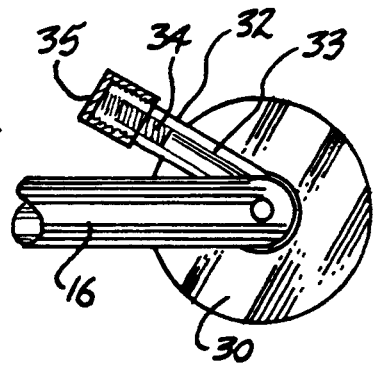
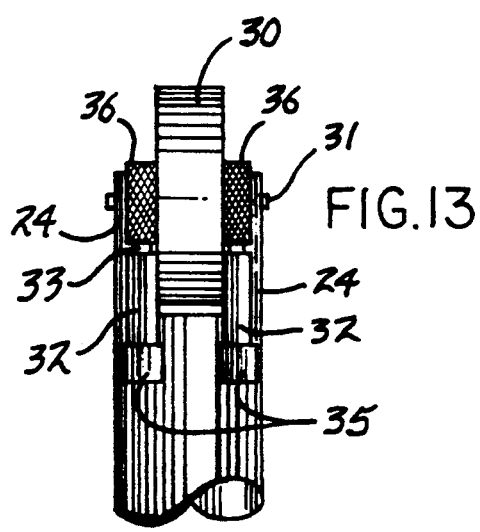

BICYCLE SAFETY BAR APPARATUS

BACKGROUND OF THE INVENTION

1. Field of the Invention

The field of invention relates to bicycle wheel structure, and more particularly pertains to a new and improved bicycle safety bar apparatus wherein the same is arranged to provide for a support wheel projecting rearwardly and radially beyond the bicycle frame and wheel structure.

2. Description of the Prior Art

Various bicycle support structure is indicated in the prior art utilizing typically training wheels, such as indicated in U.S. Pat. Nos. 4,810,000; 4,326,729; and 3,642,305.

The instant invention attempts to overcome deficiencies of the prior art in providing for a bicycle safety bar apparatus wherein the same is directed to preventing rotation of a bicycle framework about its rear wheel during bicycle stunts typically known as "wheelies". To prevent such over-rotation of the bicycle frame and attendant injury associated therewith, the instant invention is directed to mounting wheel structure projecting rearwardly and radially beyond the bicycle rear wheel and in this respect, the present invention substantially fulfills this need.

SUMMARY OF THE INVENTION

In view of the foregoing disadvantages inherent in the known types of bicycle support wheel structure now present in the prior art, the present invention provides a bicycle safety bar apparatus wherein the same is arranged to project radially beyond a bicycle rear wheel mounting a wheel pair for rotative support of the bicycle frame upon rotation of the bicycle frame about its rear wheel. As such, the general purpose of the present invention, which will be described subsequently in greater detail, is to provide a new and improved bicycle safety bar apparatus which has all the advantages of the prior art bicycle support wheel structure and none of the disadvantages.

To attain this, the present invention provides a safety bar structure arranged for retrofit relative to an associated bicycle wheel, to include projecting support rails extending radially beyond the rear bicycle wheel, wherein the support rails rotatably mount a pair of support wheels to prevent rotation of the bicycle frame about the rear wheel.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved bicycle safety bar apparatus which has all the advantages of the prior art bicycle wheel support structure and none of the disadvantages.

It is another object of the present invention to provide a new and improved bicycle safety bar apparatus which may be easily and efficiently manufactured and marketed.

It is a further object of the present invention to provide a new and improved bicycle support bar apparatus which is of a durable and reliable construction.

An even further object of the present invention is to provide a new and improved bicycle support bar apparatus which is susceptible of a low cost of manufacture with regard to both materials and labor, and which accordingly is then susceptible of low prices of sale to the consuming public, thereby making such bicycle support bar apparatus economically available to the buying public.

Still yet another object of the present invention is to provide a new and improved bicycle support bar apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 9 is an orthographic view indicating the relationship of the locking bar structure relative to the locking roller structure.

FIG. 10 is an enlarged orthographic view of section 10 as set forth in FIG. 9.

FIG. 11 is an isometric illustration of the pull cable structure mounted to the associated handlebar of the bicycle structure.

FIG. 12 is an enlarged orthographic view of the flint housings mounted relative to the flint wheels of the invention.

FIG. 13 is an enlarged orthographic top view of the invention, as indicated in FIG. 12.

DESCRIPTION OF THE PREFERRED EMBODIMENT

Figure 1:
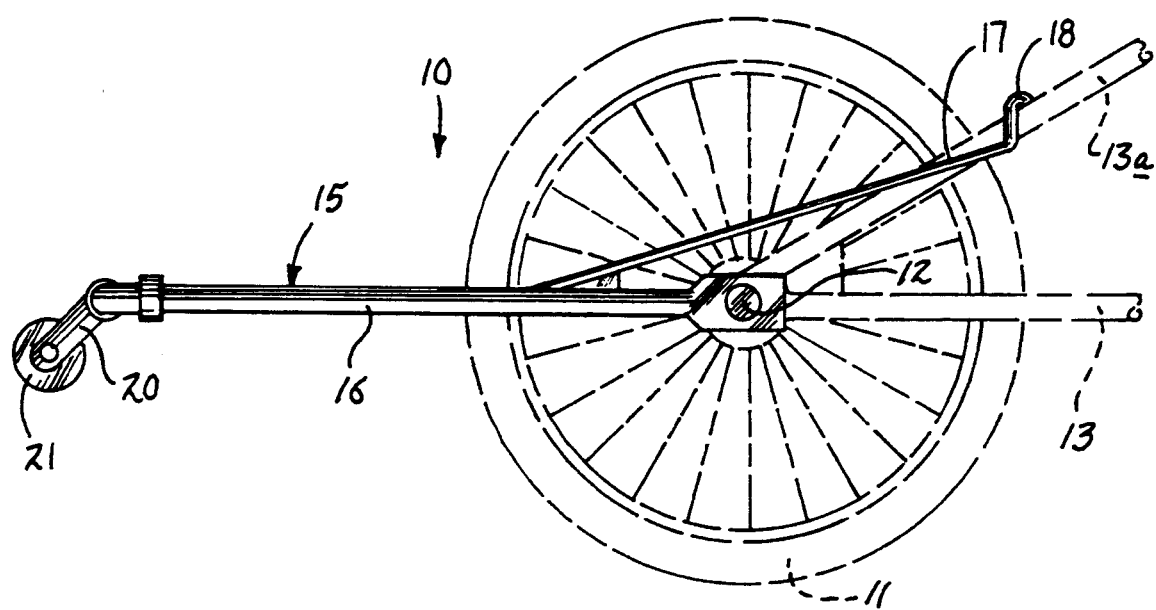
FIG. 1 is an orthographic view of the invention.

With reference now to the drawings, and in particular to FIGS. 1 to 13 thereof, a new and improved bicycle safety bar apparatus embodying the principles and concepts of the present invention and generally designated by the reference numerals 10 and 10a will be described.

Figure 2:
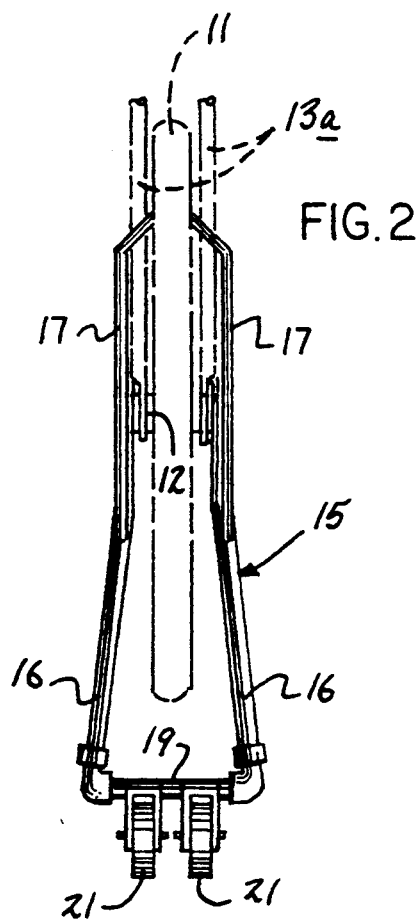
FIG. 2 is an orthographic top view of the invention.
Figure 3:
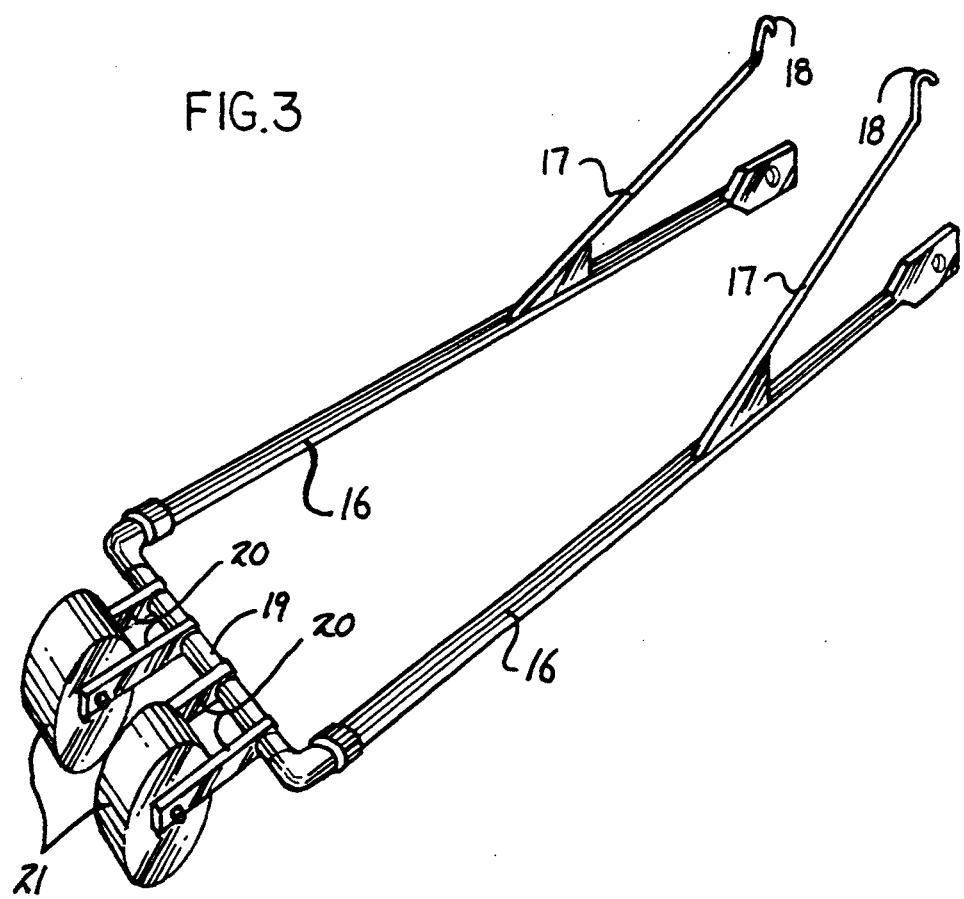
FIG. 3 is an isometric illustration of the invention.
Figure 4:
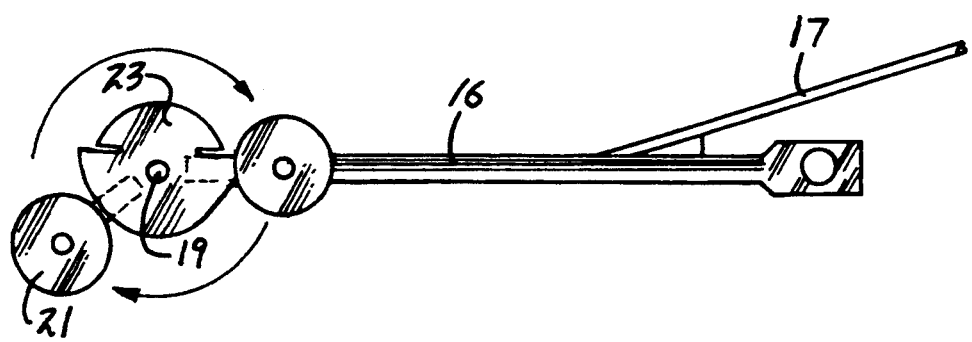
FIG. 4 is an orthographic side view of a modified aspect of the invention.
Figure 5:
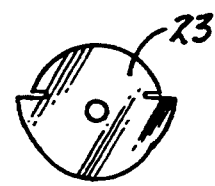
FIG. 5 is an orthographic view of locking roller structure employed by the invention, as indicated in FIG. 4.
Figure 6:
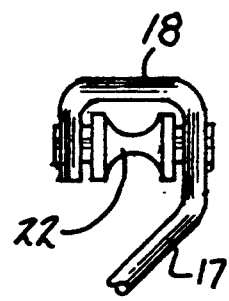
FIG. 6 is an orthographic view of connecting loop rollers mounted within the loops of the second tubular links.

More specifically, the bicycle safety bar apparatus 10 of the instant invention essentially comprises cooperation and mounting to a bicycle wheel 11 about a bicycle wheel axle 12 rotatably mounting the bicycle wheel 11. Bicycle frame first rails 13 join bicycle frame second rails 13a at the bicycle wheel axle 12. The apparatus includes a U-shaped yoke 15 having first support links 16 that are parallel and coextensive relative to one another and mounted at their forwardmost ends to the bicycle wheel axle 12 and projecting radially and rearwardly beyond the bicycle wheel 11, as indicated in FIGS. 1 and 2 for example, having a connecting link 19 at the first support link rearwardmost ends spaced from the bicycle wheel axle, such that the connecting link 19 is oriented parallel to the bicycle wheel axle. Second support links 17 extend from the first support links 16 and terminate in individual second link connecting loops 18 to extend about the second rails 13a to effect stability and geometric integrity to the organization when mounted to the bicycle wheel axle 12. Plural pairs of wheel flanges 20 are provided, with each of the wheel flanges 20 rotatably mounting a support wheel 21 therebetween. Each of the wheel flanges of each wheel flange pair 20 are arranged in a parallel coextensive relationship, and each wheel flange pair 20 is oriented at a generally obtuse included angle relative to the first support links 16 extending from the connecting link 19 in an orthogonal relationship.

Figure 7:
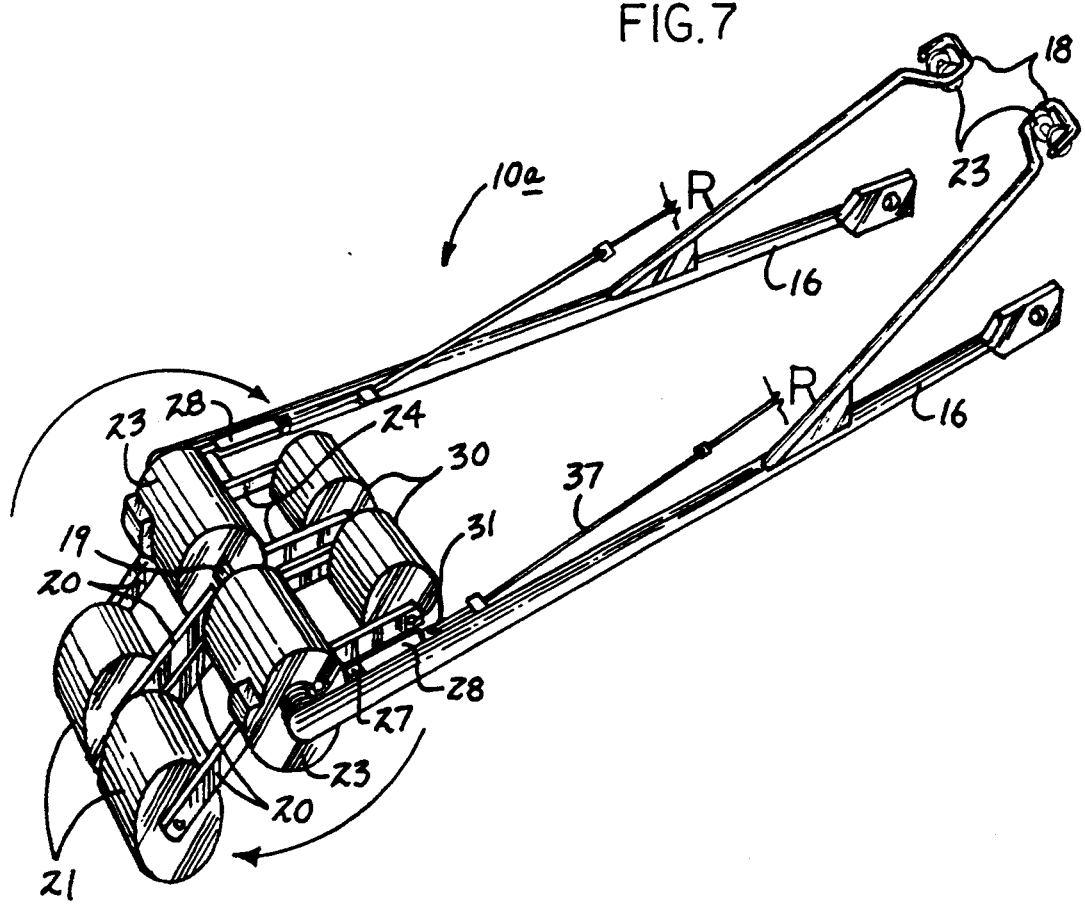
FIG. 7 is an isometric illustration of a modified apparatus of the instant invention.
Figure 8:
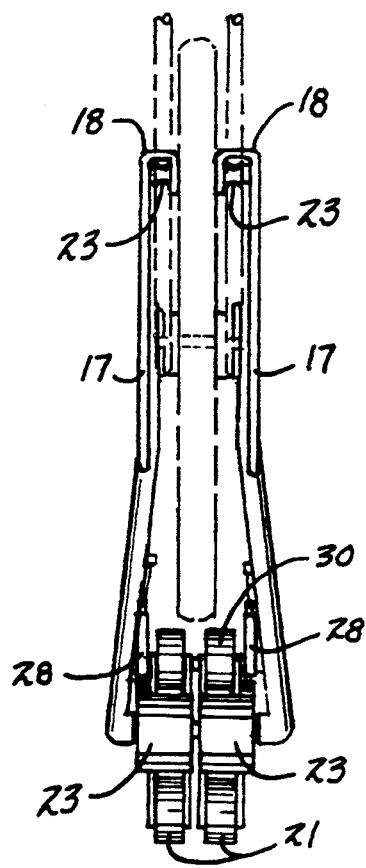
FIG. 8 is an orthographic top view of the invention, as indicated in FIG. 7.

Reference to FIG. 7 indicates the use of a modified apparatus 10a, wherein the connecting link 19 further includes a plural pair of further wheel flange pair 24. The wheel flange pair 20 and the further wheel flange pair 24 are oriented at a generally obtuse angle relative to one another and are each readily and fixedly mounted into a locking roller 23 that in turn is rotatably mounted about the connecting link 19. The locking roller 23 includes a plurality of lock bores defined as respective first and second lock bores 25 and 26 (see FIG. 9 and FIG. 10 for example) to receive an associated lock pin 27 therewithin to fixedly position the locking roller 23 relative to the connecting link 19 to orient selectively the support wheels 21 or alternatively, further support wheels 30. The further support wheels 30 are each rotatably mounted about a further support wheel axle 31 that is orthogonally directed between individual flanges of the further wheel flange pair 24. In this manner, the support wheels 21 or the further support wheels 30 are positioned in projecting relationship beyond the first support links 16 for support of the bicycle structure in a rotative relationship relative to an underlying support surface. It should be noted that the modified apparatus 10a further includes connecting loop rollers 22, with an individual roller 22 positioned within each of the connecting loops 18 for rotative positioning upon the bicycle second rails 13a (see FIGS. 7 and 8). Each lock pin 27 is reciprocatably mounted within a respective lock pin sleeve 28 that in turn is fixedly mounted to one of the first support links 16 in adjacency to the connecting link 19 such that the lock pin 27 is reciprocatably mounted in a generally orthogonal relationship relative to the connecting link 19. A spring member 29 mounted within the lock pin sleeve 28 biases the lock pin 27 in a projecting relationship relative to the lock pin sleeve for reception with one of the respective first and second lock pin bores 25 and 26 of an individual and respective locking roller 23.

Reference to the FIGS. 12 and 13 indicates that to each side of the further support wheel 30 an abrasive roller 36 is provided positioned between the further support wheel and the associated further wheel flange pair 24. In a facing relationship to each of the abrasive rollers 36 is a flint housing 32 fixedly mounted to a respective one of the further wheel flange pair 24, such that the flint housing 32 includes a flint rod 33 to engage an individual abrasive roller 36 to effect a spark display for visual entertainment, as the abrasive rollers 36 are fixedly mounted to the further support wheel 30 and rotate in unison therewith to effect engaging the associated flint rods 33 to effect such a spark shower when the further support wheels are extended beyond the first support links 16. In this manner, in the operative relationship relative to the first support links 16, the further support wheels are in a second position displaced from a first position positioned between the first support links 16, as illustrated in FIG. 7. The flint housing 32, as indicated, includes a housing spring 34 interposed between the flint rod 33 and a removable flint housing cap 35 to provide for replenishment of a flint rod 33. Further, displacement of the lock pins 27 relative to the associated lock rollers 23 is effected by a pull cable 37 mounted to each lock rod and extending to a pull cable 338 that in turn is typically mounted to the handlebar structure of the associated bicycle, as indicated in FIG. 11.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A bicycle support bar apparatus in combination with a bicycle wheel, wherein the bicycle includes a wheel axle and a plurality of first frame rails mounted to the bicycle wheel axle and a plurality of second frame rails mounted to the bicycle axle, wherein the safety bar apparatus comprises, a U-shaped yoke, the U-shaped yoke having a plurality of first support links, with each of the first support links including a forward end, and with each forward end receiving the bicycle wheel axle therethrough orthogonally oriented relative to the first support links, the support links arranged in a parallel coextensive relationship, with the first support links mounting a connecting link spaced from and parallel the bicycle wheel axle and integrally and orthogonally mounted between the first support links, and second support links fixedly mounted to the first support links extending from the first support links, with each of the second support links having a second link connecting loop, and each second link connecting loop mounted to an individual one of said second rails, and the connecting link including plural pairs of wheel flanges, with each pair of said wheel flanges mounting a support wheel rotatably therebetween, each of the wheel flanges extends radially beyond the bicycle wheel, the connecting link includes a plurality of locking rollers mounted for selective rotation about the connecting link, each pair of said wheel flanges fixedly mounted thereto, each of the locking rollers further includes a further wheel flange pair fixedly mounted thereto, wherein the further wheel flange pair and said wheel flange pair are oriented at an obtuse included relative to one another, each further wheel flange pair includes a further support wheel rotatably mounted therebetween.

2. An apparatus as set forth in claim 1 wherein each locking roller includes a first lock bore and a second lock bore, and a lock pin sleeve positioned in adjacency to an individual one of said locking rollers;, with each lock pin sleeve mounted to one of said first support links, each lock pin sleeve including a lock pin reciprocatably mounted relative to said lock pin sleeve, wherein the lock pin is selectively received within said first lock bore and said second lock bore, and wherein the lock pin sleeve includes a spring member mounted within said sleeve to bias the lock pin in a projecting relationship relative to said lock pin sleeve.

3. An apparatus as set forth in claim 2 wherein the lock pin includes a pull cable, and said pull cable extends from said lock pin that includes a pull cable lever, whereupon pivoting of said pull cable lever effects displacement of said lock pin relative to said lock pin sleeve.

4. An apparatus as set forth in claim 3 wherein each further support wheel includes at least one abrasive roller fixedly mounted thereto, and a flint housing mounted to said further wheel flange pair in facing relationship to said abrasive roller, wherein said flint housing includes a flint rod mounted therewithin, and wherein said flint rod projects beyond said flint housing in contiguous engagement with said abrasive roller, the flint housing including a flint housing spring and a flint housing cap, with the flint housing spring interposed between the flint housing cap and the flint rod to project the flint rod beyond the flint housing in engage-

* * * * *